United States Patent [19]

Yoshiga et al.

[11] Patent Number: 5,157,912

[45] Date of Patent: Oct. 27, 1992

[54] PUSH-PULL CHAIN AND RECIPROCATING APPARATUS USING THE SAME

[75] Inventors: Masayuki Yoshiga; Takuya Nomura, both of Toyota, Japan

[73] Assignee: Ryoei Engineering Co., Ltd., Aichi, Japan

[21] Appl. No.: 727,644

[22] Filed: Jul. 9, 1991

[51] Int. Cl.⁵ ............................................... F16G 13/20
[52] U.S. Cl. .......................................... 59/78; 59/84; 59/4; 474/224
[58] Field of Search ......................... 59/78, 78.1, 84, 4, 59/82, 89, 93, 87, 95, 80; 474/220, 224, 225

[56] References Cited

U.S. PATENT DOCUMENTS

| | | | |
|---|---|---|---|
| 774,470 | 11/1904 | Hamilton et al. | 59/78 |
| 2,417,141 | 3/1947 | Syfert | 59/78 |
| 3,309,864 | 3/1967 | Arndt et al. | 474/224 |
| 4,658,577 | 4/1987 | Klein | 59/78.1 |
| 4,885,907 | 12/1989 | Pappanikolaou | 59/78 |

FOREIGN PATENT DOCUMENTS

| | | | |
|---|---|---|---|
| 53-45869 | 12/1978 | Japan . | |
| 58-52101 | 11/1983 | Japan . | |
| 488036 | 1/1976 | U.S.S.R. | 59/78.1 |
| 1075974 | 7/1967 | United Kingdom | 59/78.1 |

Primary Examiner—David Jones
Attorney, Agent, or Firm—Frishauf, Holtz, Goodman & Woodward

[57] ABSTRACT

A push-pull chain having a lock mechanism provided between inner links and outer links, which are rotatably coupled together by link pins, to thereby permit the mutual pivotal movement of both links to be restricted. The lock mechanism is provided to both links on an axial line parallel to each link pin. As a lock pin moves parallel on the axial line and it is fitted in both links, the mutual pivotal movement of the links is locked.

20 Claims, 3 Drawing Sheets

PUSH-PULL CHAIN AND RECIPROCATING APPARATUS USING THE SAME

BACKGROUND OF THE INVENTION

The present invention relates to a push-pull chain which can be used in either the pushing or pulling direction without varying the length of the chain. This is accomplished by restricting the relative pivotal movement between outer links and inner links. A second invention comprises a reciprocating apparatus using this push-pull chain.

As for push-pull chains of this type, the following are known: A first one is designed in such a way that projections provided on the top surface of a link plate engage with each other to restrict the upward bending of the link plate, as disclosed in Japanese Examined Patent Publication No. 52101/1983. A second one is a push-pull chain designed as disclosed in Japanese Examined Patent Publication No. 45869/1978 so that link pins each are of a notch type having both sides cut horizontally, and the notch pin is inserted in a key-shaped pin hole bored in an outer link plate to restrict the pivotal movement of the chain. The first push-pull chain has the shortcoming that while the upward bending is restricted, the downward bending is not restricted. Although the second push-pull chain can restrict bending in both upward and downward directions, the length of the chain varies between when it is pulled and when it is pushed. This shortcoming is inconvenient, when a work connected to the chain undergoes reciprocating movement.

SUMMARY OF THE INVENTION

It is therefore an object of the present invention to provide a push-pull chain which can restrict both upward and downward bending and whose length does not change between when it is pulled and when it is pushed, and to provide a reciprocating apparatus using this chain.

To achieve this object, according to one aspect of the present invention, there is provided a push-pull chain comprising: a) inner links; b) outer links; c) pivot pins coupling the inner links and the outer links which permit the chain to bend around a sprocket or an arcuate guide surface; and d) lock mechanisms capable of restricting bending of the inner links and outer links, when that portion of the chain is moving in a straight line, said lock machanisms being located relatively outward of the pivot pins from the center of the radius of curvature of said bending movement, each lock mechanism including, an inner bush fitted in each of the inner links, an engage pin fitted slidable in the inner bush, an outer bush fitted in those portions of the outer links which are aligned with the inner bush when that portion of the chain is moving in a straight line, and push pins slidably fitted in the outer bushes for pushing the engage pin into and/or out of said outer bush.

According to another aspect of the present invention, there is provided a reciprocating apparatus using such a push-pull chain, which comprises at least one sprocket around which the push-pull chain is put; and outer and inner rails respectively provided at a peripheral portion of each sprocket for guiding the push-pull chain and a lock-mechanism activating means adjacent the path of travel of the push-pull chain.

DETAILED DESCRIPTION OF THE PREFERRED EMBODIMENTS

Preferred embodiments of the present invention will now be described referring to the accompanying drawings.

Figure 1:
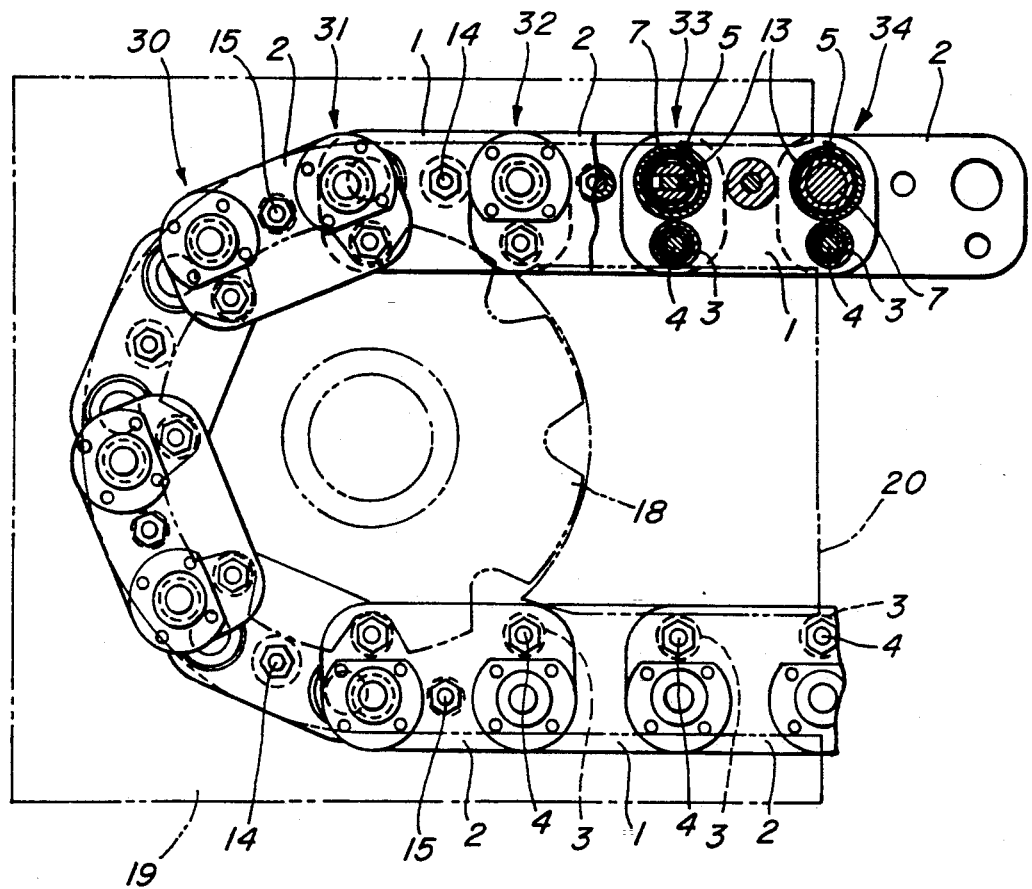
FIG. 1 is a partly cutaway front view illustrating an embodiment of the first invention.
Figure 2:
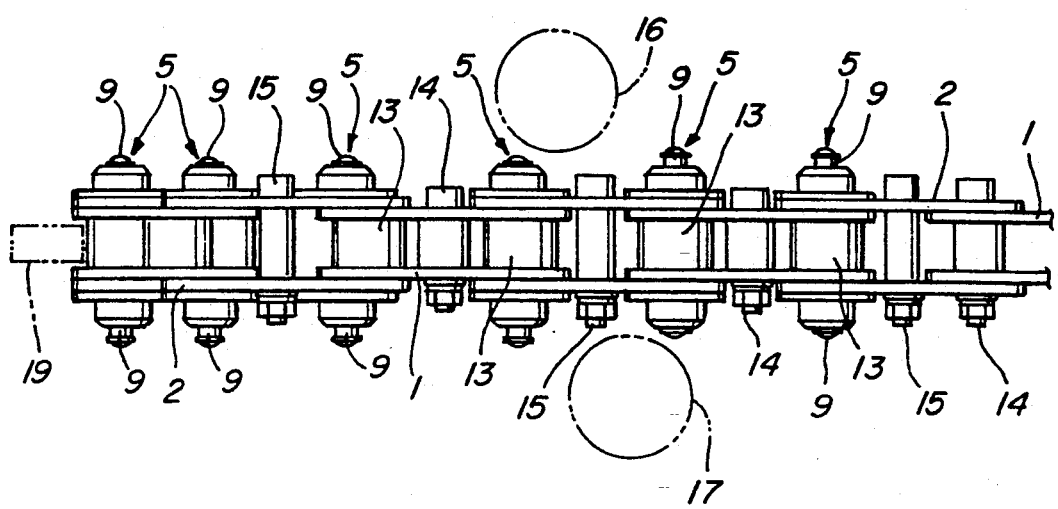
FIG. 2 is a partly cutaway plan view of the embodiment.
Figure 3:
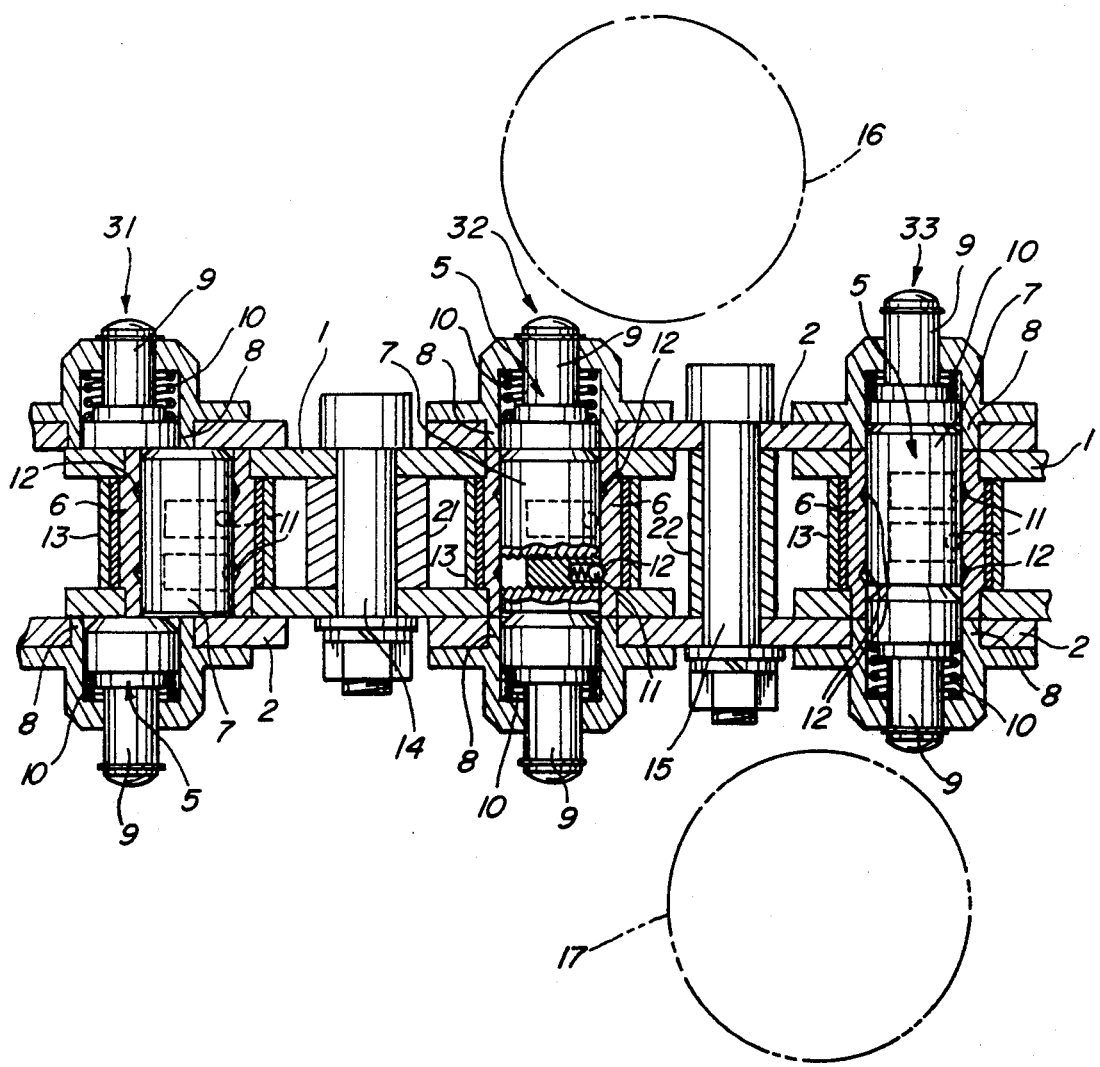
FIG. 3 is a partly cutaway plan view of the essential portions of the embodiment.
Figure 4:
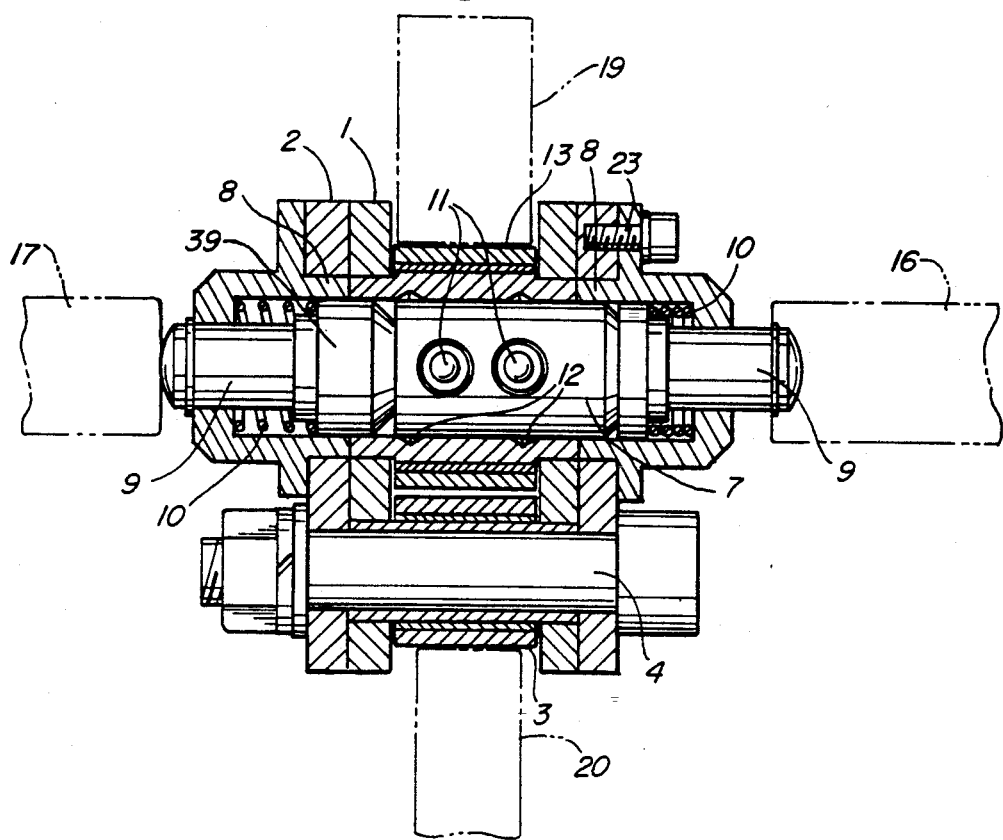
FIG. 4 is a partly cutaway side view of the embodiment.

Referring now to FIGS. 1-4, pairs of parallel inner links 1 and pairs of parallel outer links 2 are joined together in the manner shown to form a push-pull chain. Links 1 and 2 are coupled together at their inward, overlapping corners by roller-equipped pivot pins 4. Each pivot pin 4 has a roller 3 mounted thereon, and each pivot pin is located as to traverse an inward path when the chain is moved in the direction of its length. Lock mechanisms 5 are provided which traverse a path parallel to but outward of the path of the pivot pins 4. Each lock mechanism 5 includes a dead-bolt type mechanism consisting of an engage pin 7 fitted slidable in an inner bush 6 which is fitted between a pair of inner links 1, and push pins 9 which are individually fitted slidable in an aligned pair of outer bushes 8 fitted in the outer links 2 and fixed thereto by screws 23; see FIGS. 3 and 4. When the links are moving in a straight line (lock mechanisms 32, 33, and 34 in FIGS. 1 and 3), the outward corners of the links 1 and 2 overlap, aligning the axes of bush 6 and engage pin 7 with the axes of bushes 8 and push pins 9. Under straight line conditions, if the upper push pin 9, as seen in the FIG. 3 orientation, is pushed downwardly, it will push the engage pin 7 out of engagement with upper bush 8; this is the unlocked position shown by lock mechanism 32 (FIGS. 1 and 3). If the lower push pin 9 is pushed upwardly, it will push engage pin 7 upwardly into engagement with upper bush 8. At the same time, enlarged base 39 of push pin 9 will engage with inner bush 6. This is the locked position shown by lock mechanism 33 in FIG. 3 and by the lock mechanism shown in FIG. 4. In the locked position, inner links 1 and outer links 2 cannot move relative to each other. This insures the length of the push-pull chain will remain constant regardless of which direction the chain is being moved.

Inner bush 6 has a pair of annular, V-shaped grooves 12 formed in its inner wall. A pair of spring-biased detents 11 are provided in the lateral wall of engage pin 7. Detents 11 cooperate with grooves 12 to stably but releasably hold engage pin 7 in either the unlocked or locked position. Springs 10 are located between the large head portion of the push pins 9 and the bottom of the associated outer bush 8 to urge the push pins 9 to the unlocked position.

When the lock mechanism 5 is unlocked, the contiguous corners of inner links 1 and outer links 2 are free to slide relative to each other. When the push-pull chain then travels along an arcuate path, as when going around a sprocket (FIG. 1) or an arcuate guide surface, the links will pivot around pivot pins 4 and the outward corners of overlapping links 1 and 2 will slide over one another causing the axes of bush 6 and engage pin 7 to become misaligned with the axes of bushes 8 and push pins 9. Lock mechanisms 30 and 31 (FIGS. 1 and 3) show this condition.

Roller 13 is fitted in the inner bush 6. Pin 14 couples the link plates of the inner links 1, and pins 15 couple the link plates of the outer links 2. Pins 14 and 15 along with spacers 21 and 22 maintain the desired width of the push-pull chain.

Lock mechanisms 5 are activated by rollers 16 and 17. The following will describe how the lock mechanisms shown in FIG. 3 are activated. Assume the chain is moving from right to left. Lock mechanism 31 is moving around sprocket 18, so it is in the unlocked state, and the axes of engage pin 7 and bushes 8 are misaligned. Lock mechanism 32 has just passed adjacent roller 16. As the push pin 9 (top side in FIG. 3) whose proximal end portion protrudes from the outer bush 8 abuts on the roller 16, the push pin 9 is pushed in from the position shown in lock mechanism 33 to that shown in lock mechanism 32. As a result, the engage pin 7 whose tip is fitted in the associated outer bush 8 is pushed back within the inner bush 6. Also, the other push pin 9 (bottom side in FIG. 3) whose tip 39 is fitted in the inner bush 6 is pushed back within the other outer bush 8, permitting free pivotal movement of the inner links 1 and outer links 2. As lock mechanism 33 passes roller 16, its push pin 9 will also be pushed in and lock mechanism 33 will unlock.

Assume now the chain is moving in the opposite direction, i.e., from left to right. As a given lock mechanism moves from the misaligned state (lock mechanism 31), as when it is still in contact with sprocket 18, to a straight line path, the locking parts align but are unlocked (lock mechanism 32). As lower pin 9 abuts roller 17, it is pushed to the position shown by lock mechanism 33, thereby locking the links 1 and 2 together In other words, the upper tip of the engage pin 7 is fitted in the outer bush 8 while the tip 39 of the push pin 9 is fitted in the inner bush 6, thus restricting the relative pivotal movement of the inner links 1 and outer links 2.

Figure 5:
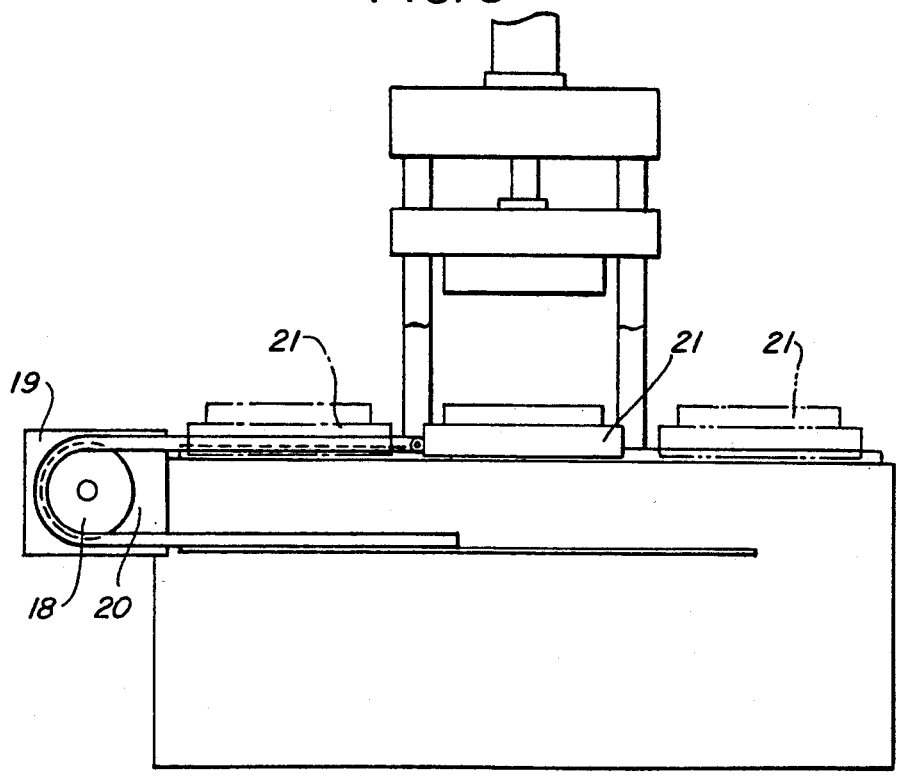
FIG. 5 is a front view showing an embodiment of the second invention.

In FIG. 5, a forward/rearward rotational motor is mounted on at least one sprocket 18 around which the push-pull chain is put. An outer rail 19 and an inner rail 20, both V-shaped, are respectively provided at a peripheral portion of the sprocket 18 to guide the movement of the push-pull chain. Reference numeral "21" denotes a slidable driven member.

While the lock mechanism 5 is activated by the rollers 16 and 17 in this embodiment, the push pins 9 may be electrically activated directly by solenoids or other means. The number of the sprockets 18 is not limited to one, but multiple sprockets may be provided to permit the push-pull chain to be freely bent. In this case, the location of the driving means (such as a motor) is not limited, thus increasing the freedom of the design.

The thus constituted apparatus of the present invention functions as follows: With the push-pull chain put around the sprocket 18 and the free end of the push-pull chain attached to the driven member 21, the sprocket 18 is rotated in the forward direction by the forward-/reverse rotational motor. As a result, the push-pull chain is guided by the outer rail 19 and inner rail 20 and is fed out. At this time, the push pin 9 whose proximal end portion protrudes from the outer bush 8 is pushed by the roller 17. The engage pin 7 is therefore pushed out by the push pin 9, so that its tip is fitted in the outer bush 8 and the tip 39 of the push pin 9 is fitted in the inner bush 6. As a result, the pivotal movement of the inner links 1 and the outer links 2 is restricted by the lock mechanism 5, permitting the push-pull chain to be fed out in an unbendable, straight rod shape. Consequently, the driven member attached to the free end of the chain moves forward.

When the motor is rotated in the reverse direction, the above-described functions will be reversed. Roller 16 unlocks the links and the unbendable state of the push-pull chain is released, so that the chain is wound around the sprocket 18. The driven member 21 attached to the free end of the push-pull chain is thereby moved backward.

As should be obvious from the foregoing description, the push-pull chain according to the first invention can completely restrict the pivotal movement of the inner links and outer links at any location while its total length does not vary. The general use of this chain is therefore increased. The reciprocating apparatus according to the second invention using this push-pull chain can be designed significantly compact as compared with the conventional cylinder-using apparatus, and needs about half the space for its installation.

Overcoming the conventional problems, the push-pull chain of the present invention and the reciprocating apparatus using this chain are very advantageous in the concerned field.

What is claimed is:

1. A push-pull chain, comprising:
   a plurality of pairs of parallel inner links and pairs of parallel outer links, alternate pairs of said parallel inner links being sequentially coupled to alternate pairs of said parallel outer links by coupling means, said coupling means comprising:
   a) a pivot pin comprising a body and opposite ends, said pivot pin having journalled thereon one of said inner link pairs and one of said outer link pairs, each one of said outer links of said outer link pair being journalled on said pivot pin closer to a respective one of said opposite ends of said pivot pin than either one of said inner links, said pivot pin permitting relative pivotal movement between said inner and outer link pairs; and
   b) lock means connected to said inner and outer link pairs for selectively locking said inner and outer links, thereby prohibiting relative pivotal movement therebetween, and for selectively unlocking said inner and outer link pairs, thereby permitting relative pivotal movement therebetween.

2. The chain of claim 1, wherein said lock means comprises an inner bush fitted in and between said pair of parallel inner links, an engage pin slideably fitted in said inner bush, and means for shifting said engage pin into engagement with an opening in one link of said pair of parallel outer links, to thereby lock said lock means.

3. The chain of claim 2, wherein said opening in said one link, of said pair of parallel outer links is aligned with a similar opening in the other link of said pair of parallel outer links, and said shifting means comprises an outer bush mounted on each link of said pair of outer links adjacent the opening in each link of said pair of outer links, and a pair of push pins, one push pin being mounted in each of said outer bushes for pushing said engage pin into said engagement with an opening in one of said outer links.

4. The chain of claim 3, wherein each of said lock means is lockable only when the adjacent pairs of said pairs of parallel inner links and said pairs of parallel outer links which coact with said each lock means are linearly oriented.

5. The chain of claim 4, wherein said outer bushes and their associated push pins extend from the outer side of said outer links.

6. The chain of claim 5, wherein each said push pin is biased by a spring arranged in said outer bush.

7. The chain of claim 2, further comprising holding means provided between said inner bush and said engage pin for stably but releasably holding said engage pin in either a locked or unlocked position.

8. The chain of claim 7, wherein said holding means comprises a pair of annular grooves formed in one of said inner bush and said engage pin, and a pair of spring-loaded detents located in a lateral side of the other of said inner bush and said engage pin.

9. A chain drive apparatus comprising:
a push-pull chain;
at least one sprocket gear having said chain therearound;
a forward/reverse motor for driving said sprocket gear; and
a work-piece connected to said chain, said chain comprising:
a plurality of pairs of parallel inner links and pairs of parallel outer links, alternate pairs of said parallel inner links being sequentially coupled to alternate pairs of said parallel outer links by coupling means, said coupling means comprising:
a) a pivot pin comprising a body and opposite ends, said pivot pin having journalled thereon one of said inner link pairs and one of said outer link pairs, each one of said outer links of said outer link pair being journalled on said pivot pin closer to a respective one of said opposite ends of said pivot pin than either one of said inner links, said pivot pin permitting relative pivotal movement between said inner and outer link pairs; and
b) lock means connected to said inner and outer link pairs for selectively locking said inner and outer link pairs, thereby prohibiting relative pivotal movement therebetween, and for selectively unlocking said inner and outer link pairs, thereby permitting relative pivotal movement therebetween.

10. The apparatus of claim 9, further including actuating means for actuating said lock means to cause said lock means to lock.

11. The apparatus of claim 10, wherein said lock means comprises an inner bush fitted in and between said pair of parallel inner links, an engage pin slidably fitted in said inner bush and shiftable, when actuated by said actuating means, into engagement with an opening in one link of said pair of parallel outer links, to thereby lock said lock means.

12. The apparatus of claim 11, wherein said opening in said one link of said pair of parallel outer links is aligned with a similar opening in the other outer link of said pair of parallel outer links, and further comprising an outer bush fitted in each of said outer link pair openings, and a push pin mounted in each of said outer bushes for pushing said engage pin into said engagement with an opening in one of said outer links.

13. The apparatus of claim 12, wherein each of said lock means is lockable only when the adjacent pairs of said pairs of parallel inner links and said pairs of parallel outer links which coact with said each lock means are linearly oriented.

14. The apparatus of claim 13, wherein said outer bushes and their associated push pins extend from the outer side of said outer links.

15. The apparatus of claim 14, wherein each said push pin is biased by a spring arranged in said outer bush.

16. The apparatus of claim 15, wherein said actuating means comprises roller arranged at either side of said apparatus and urging against said push pins at either side of the chain when passing thereof, to cause locking of said lock means.

17. The apparatus of claim 11, further comprising holding means provided between said inner bush and said engage pin for stably but releasably holding said engage pin in either a locked or unlocked position.

18. The apparatus of claim 17, wherein said holding means comprises a pair of annular grooves formed in one of said inner bush and said engage pin, and a pair of spring-loaded detents located in a lateral side of the other of said inner bush and said engage pin.

19. A push-pull chain system, comprising:
(a) a push-pull chain comprising:
a plurality of pairs of parallel inner links and pairs of parallel outer links, alternate pairs of said parallel inner links being sequentially coupled to alternate pairs of said parallel outer links by coupling means, said coupling means comprising:
(i) a pivot pin comprising a body and opposite ends, said pivot pin having journalled thereon one of said inner link pairs and one of said outer link pairs, each one of said outer links of said outer link pair being journalled on said pivot pin closer to a respective one of said opposite ends of said pivot pin than either one of said inner links, said pivot pin permitting relative pivotal movement between said inner and outer link pairs; and
(ii) lock means connected to said inner and outer link pairs for selectively locking said inner and outer links, thereby prohibiting relative pivotal movement therebetween, and for selectively unlocking said inner and outer link pairs, thereby permitting relative pivotal movement therebetween; and
(b) actuating means for actuating said lock means to cause said lock means to lock.

20. The push-pull chain system of claim 19, wherein:
said lock means comprises push pins for locking of said lock means, one push pin being mounted at each side of said chain; and
said actuating means comprises rollers arranged at either side of said chain and urging against said push pins at either side of said chain when passing said push pins, to cause locking of said lock means.

* * * * *